United States Patent
Hamada et al.

(10) Patent No.: US 10,657,847 B2
(45) Date of Patent: May 19, 2020

(54) SECRET RANDOM NUMBER SYNTHESIZING DEVICE, SECRET RANDOM NUMBER SYNTHESIZING METHOD, AND PROGRAM

(71) Applicant: NIPPON TELEGRAPH AND TELEPHONE CORPORATION, Chiyoda-ku (JP)

(72) Inventors: Koki Hamada, Musashino (JP); Ryo Kikuchi, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 100 days.

(21) Appl. No.: 15/762,314

(22) PCT Filed: Oct. 11, 2016

(86) PCT No.: PCT/JP2016/080052
§ 371 (c)(1),
(2) Date: Mar. 22, 2018

(87) PCT Pub. No.: WO2017/065123
PCT Pub. Date: Apr. 20, 2017

(65) Prior Publication Data
US 2018/0261133 A1  Sep. 13, 2018

(30) Foreign Application Priority Data
Oct. 13, 2015 (JP) .................. 2015-202058

(51) Int. Cl.
*G06C 1/00* (2006.01)
*G09C 1/00* (2006.01)
*G06F 7/58* (2006.01)

(52) U.S. Cl.
CPC ............... *G09C 1/00* (2013.01); *G06F 7/586* (2013.01); *H04L 2209/46* (2013.01)

(58) Field of Classification Search
CPC ....................................................... G09C 1/00
(Continued)

(56) References Cited

U.S. PATENT DOCUMENTS

2015/0381348 A1* 12/2015 Takenaka ............... H04L 9/008
380/30

OTHER PUBLICATIONS

Koji Chida, et al., "A Three-Party Secure Function Evaluation with Lightweight Verifiability Revisited," CSS, 2010, 6 pages (with English abstract).

(Continued)

*Primary Examiner* — Anthony D Brown
(74) *Attorney, Agent, or Firm* — Oblon, McClelland, Maier & Neustadt, L.L.P.

(57) ABSTRACT

A combination of secure texts of values "a", "b" and "c" having a relationship c=ab is efficiently generated. A secure text generation part 12 generates secure texts $[x_i]$ of $x_i$ satisfying $x_i=f(k_i)$, and secure texts $[y_i]$ of $y_i$ satisfying $y_i=g(k_i)$, for i=0, . . . , m. A fragment generation part 13 generates $\varepsilon_i$ decrypted from $[x_i]-[a_i]$ and $\rho_i$ decrypted from $[y_i]-[b_i]$, for i=1, . . . , m, and calculates $[c_i]+\varepsilon_i[b_i]+\rho_i[a_i]+\varepsilon_i\rho_i$ and generates secure texts $[z_1], \ldots, [z_m]$; and A random number synthesizing part 14 generates a secure text $[z_0]$ using different values $k_0, \ldots, k_m$ and secure texts $[z_1], \ldots, [z_m]$.

5 Claims, 3 Drawing Sheets

(58) Field of Classification Search
USPC .......................................................... 380/28
See application file for complete search history.

(56) References Cited

OTHER PUBLICATIONS

Ivan Damgard, et al., "Practical Covertly Secure MPC for Dishonest Majority—or: Breaking the SPDZ Limits," Computer Security—ESORICS 2013, vol. 8134 of Lecture Notes in Computer Science, 2013, 44 pages.
Koki Hamada, et al., "Commodity-Based Secure Multi-party Computation," Computer Security Symposium 2015, vol. 2015, No. 3, Oct. 21-23, 2015, 9 pages (with English abstract).
International Search Report dated Nov. 8, 2016 in PCT/JP2016/080052 filed Oct. 11, 2016.

\* cited by examiner

SECRET RANDOM NUMBER SYNTHESIZING DEVICE, SECRET RANDOM NUMBER SYNTHESIZING METHOD, AND PROGRAM

TECHNICAL FIELD

The present invention relates to an applied cryptography technique and, in particular, to a technique of synthesizing a random number without disclosing input data.

BACKGROUND ART

Methods of obtaining specific operation results without decrypting encrypted numerical values include a method called secret calculation (e.g., Non-patent literature 1). The method of Non-patent literature 1 performs encryption that allows three secret calculation devices to share the fragments of the numerical value, and the three secret calculation devices perform cooperative operation, which can allow the three secret calculation devices to hold the results of addition and subtraction, constant addition, multiplication, constant multiplication, logical operation (negation, logical conjunction, logical disjunction, and exclusive OR), and data format conversion (integer, and binary numeral) without decrypting the numerical value, in a state of being shared among these devices, i.e., being left encrypted.

There is a method of Non-patent literature 2 as a method capable of efficiently performing multiplication using the secure texts of plain texts "a", "b" and "c" having a relationship c=ab in a case of multiplication through secret calculation.

PRIOR ART LITERATURE

Non-Patent Literature

Non-patent literature 1: Koji Chida, Koki Hamada, Dai Ikarashi, and Katsumi Takahashi, "A Three-Party Secure Function Evaluation with Lightweight Verifiability Revisited", CSS, 2010.

Non-patent literature 2: Ivan Damgard, Marcel Keller, Enrique Larraia, Valerio Pastro, Peter Scholl, and Nigel P. Smart, "Practical covertly secure MPC for dishonest majority—or: Breaking the SPDZ limits", Computer Security—ESORICS 2013, vol. 8134 of Lecture Notes in Computer Science, pp. 1-18, 2013.

SUMMARY OF THE INVENTION

Problems to be Solved by the Invention

Unfortunately, the conventional art described in Non-patent literature 2 uses somewhat homomorphic encryption that has significantly high calculation cost, for the sake of creating a combination of secure texts where plain texts "a", "b" and "c" have a relationship c=ab. Consequently, the efficiency is low.

In view of such a point, the present invention has an object to provide a technique for efficiently creating a combination of secure texts of values "a", "b" and "c" having a relationship c=ab.

Means to Solve the Problems

To solve the above problems, a secret random number synthesizing device according to the present invention, assuming that "t" is an integer of zero or more, m=2t+1, "i" is any of integers ranging from one to "m", inclusive, $[a_i]$, $[b_i]$ and $[c_i]$ are secure texts of "$a_i$", "$b_i$" and "$c_i$" whose numbers are each "m", $k_0, \ldots, k_m$ are (m+1) different values, and f(x) and g(x) are random t-th order polynomials, comprises: a secure text generation part that generates secure texts $[x_i]$ of $x_i$ satisfying $x_i=f(k_i)$, and secure texts $[y_i]$ of $y_i$ satisfying $y_i=g(k_i)$, for i=0, . . . , m; a fragment generation part that generates $\varepsilon_i$ decrypted from $[x_i]-[a_i]$ and $\rho_i$ decrypted from $[y_i]-[b_i]$, for i=1, . . . , m, and calculates $[c_i]+\varepsilon_i[b_i]+\rho_i[a_i]+\varepsilon_i\rho_i$ and generates secure texts $[z_1], \ldots, [z_m]$; and a random number synthesizing part that generates a secure text $[z_0]$ by calculating a following formula, $$[z_0] \leftarrow \sum_{j=1}^{2t+1} \lambda_j(k_0)[z_j]$$

where $$\lambda_j(x) = \prod_{1 \leq i \leq 2t+1, i \neq j} \frac{x - k_i}{k_j - k_i}$$

Effects of the Invention

The secret random number synthesizing technique according to the present invention can efficiently create the combination of secure texts of values "a", "b" and "c" having the relationship c=ab.

DETAILED DESCRIPTION OF THE EMBODIMENTS

Prior to the description of embodiments, the representation method and definition of terms in this Description are described.

<Representation Method>

A value secreted by applying encryption or secret sharing to a certain value "a" is called a secure text of the "a" and is represented as [a]. The "a" is called the plain text of [a]. In a case where the secreting is secret sharing, a set of the secret sharing fragments held by each party owing to [a] is referred to. A share held by an i-th party $P_i$ in the secure text [a] is referred to using $[a]_i$. The share is a fragment obtained by secret sharing. The party is each participant who cooperatively performs secret calculation.

<Decryption>

A process of calculation the plain text "a" from the secure text [a] is called decryption, and is described as in the following formula.

$$a \leftarrow \text{Reveal}([a])$$

<Addition, Subtraction, and Constant Multiplication>

Addition and subtraction that are each applied to the secure text adopt secure texts [a] and [b] of two values "a" and "b" as inputs, and calculate the secure texts $[d_1]$ and $[d_2]$ of the calculation results "$d_1$" and "$d_2$" of "a+b" and "a-b".

The constant multiplication operation to the secure text adopts the secure text [a] of the value "a", and the plain text "c" as inputs, and calculates the secure text [$d_3$] of the calculation result "$d_3$" of "ca".

Execution of such operation is described as in the following formula.

$$[d_1] \leftarrow \text{Add}([a],[b]),$$

$$[d_2] \leftarrow \text{Sub}([a],[b]),$$

$$[d_3] \leftarrow \text{CMul}(c,[a])$$

Note that in a case without any fear of causing misunderstanding, Add([a], [b]), Sub([a], [b]), and CMul(c, [a]) are abbreviated as [a]+[b], [a]−[b], and c[a], respectively.

<Generation of Random Secure Text>

A process of generating a secure text [r] of a random value "r" unknown to anybody is described as in the following formula.

$$[r] \leftarrow \text{Rand}(\ )$$

Embodiments of the present invention are hereinafter described in detail. In the diagrams, configuration parts having the same functions are assigned the same numerals, and redundant description is omitted.

[First Embodiment]

Figure 1:
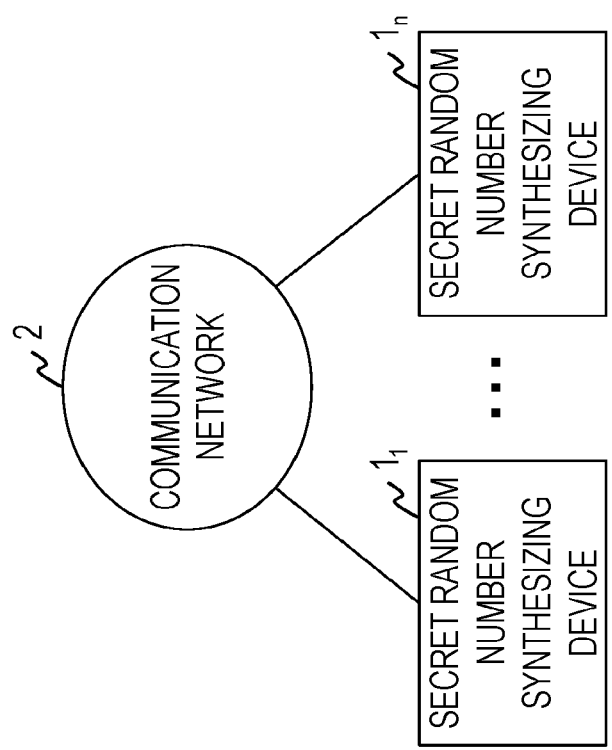
FIG. 1 is a diagram exemplifying a functional configuration of a secret random number synthesizing system.

A secret random number synthesizing system of a first embodiment comprises n (≥2) secret random number synthesizing devices $1_1, \ldots, 1_n$, as exemplified in FIG. 1. In this embodiment, the secret random number synthesizing devices $1_1, \ldots, 1_n$ are each connected to a communication network 2. The communication network 2 is a communication network that is of a circuit switching scheme or a packet switching scheme and is configured to be capable of communicating with each of the secret random number synthesizing devices $1_1, \ldots, 1_n$. For example, the Internet, LAN (Local Area Network), WAN (Wide Area Network) or the like may be used. Each device is not necessarily capable of communicating online via the communication network 2. For example, it may be configured such that information to be input into the secret random number synthesizing devices $1_i$ (i∈{0, . . . , n−1}) may be stored in a portable recording medium, such as magnetic tape or a USB memory, and input may be made offline from the portable recording medium.

Figure 2:
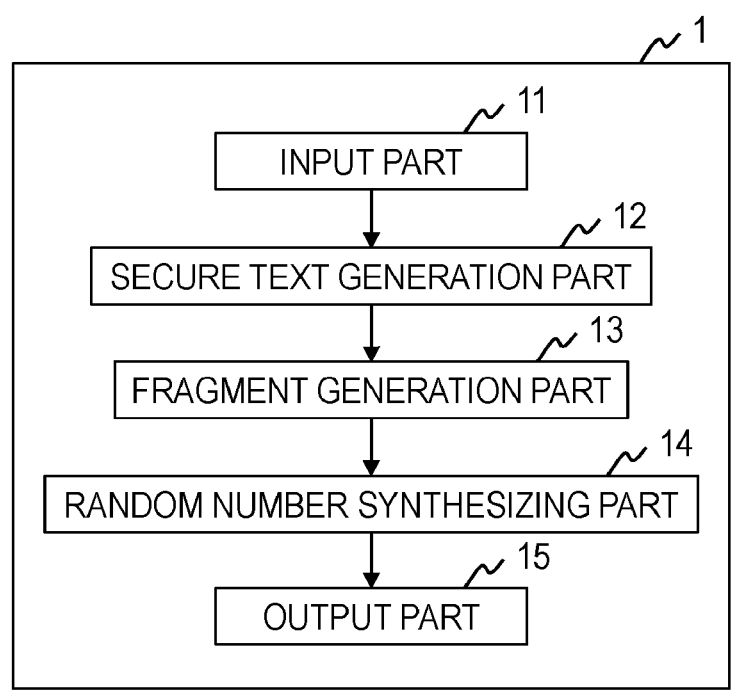
FIG. 2 is a diagram exemplifying a functional configuration of a secret random number synthesizing device.

As exemplified in FIG. 2, the secret random number synthesizing device 1 comprises an input part 11, a secure text generation part 12, a fragment generation part 13, a random number synthesizing part 14, and an output part 15. The secret random number synthesizing device 1 performs the process of each step exemplified in FIG. 3, thereby achieving a secret random number synthesizing method according to the first embodiment.

The secret random number synthesizing device 1 is a specific device configured to comprise a publicly known or dedicated computer which comprises a central processing unit (CPU) and a main memory (RAM: Random Access Memory) and in which a special program is installed. The secret random number synthesizing device 1 executes each process under control by the central processing unit, for example. Data items input into the secret random number synthesizing device 1 and data items obtained by each process are stored in the main memory, for example. The data items stored in the main memory are read by the central processing unit as required, and are used for another process. At least a part or some of the processing parts of the secret random number synthesizing device 1 may comprise hardware, such as an integrated circuit.

Figure 3:
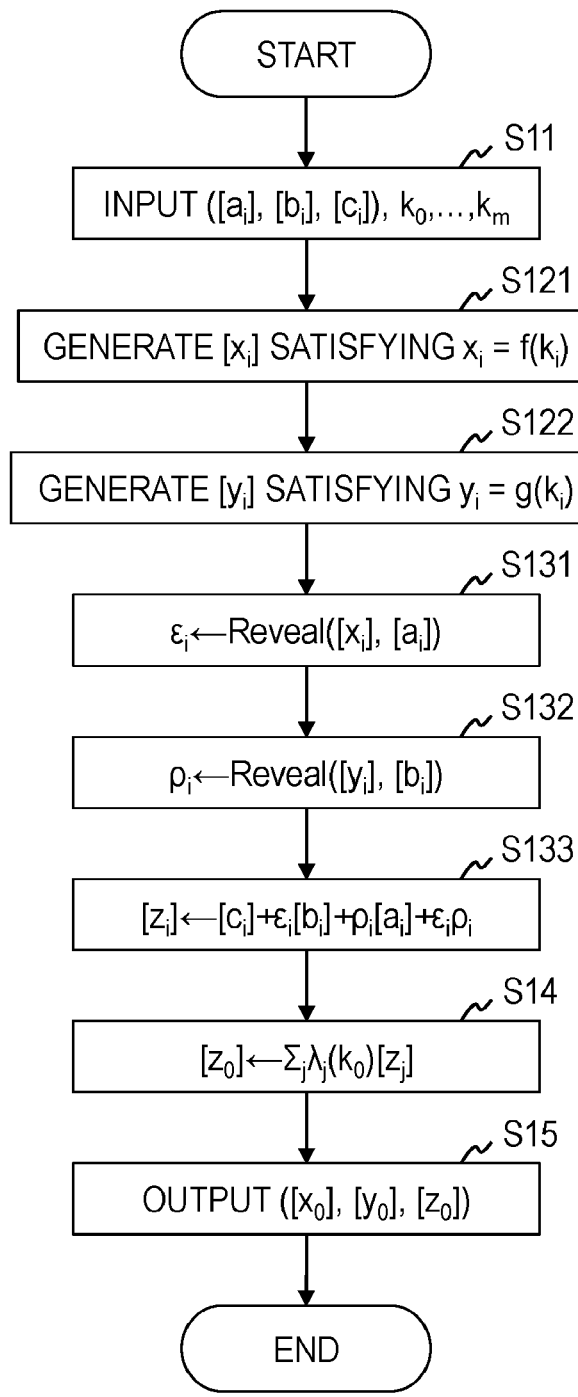
FIG. 3 is a diagram exemplifying a process flow of a secret random number synthesizing method.

Referring to FIG. 3, the processing procedures of the secret random number synthesizing method according to the first embodiment are described.

In step S11, in triples of secure texts ([$a_i$], [$b_i$] and [$c_i$]) of values "$a_i$", "$b_i$" and "$c_i$", and (m+1) values $k_0, \ldots, k_m$ are input into the input part 11. Here, m=2t+1. "t" is an integer of zero or more. "i" is any of integers ranging from one to "m", inclusive. The values $k_0, \ldots, k_m$ are freely selected different values, and preliminarily shared by all the secret random number synthesizing devices $1_1, \ldots, 1_n$. The values $k_0, \ldots, k_m$ are transmitted to the secure text generation part 12. The secure texts ([$a_i$], [$b_i$] and [$c_i$]) are transmitted to the fragment generation part 13.

In step S121, the secure text generation part 12 generates the secure text [$x_i$] of "$x_i$" that satisfies $x_i = f(k_i)$ for i= 0, . . . , m, where f(x) is a random t-th order polynomial unknown to anyone. The random t-th order polynomial is a t-th order polynomial that has terms with randomly selected coefficients. The secure texts [$x_1$], . . . , [$x_m$] are transmitted to the fragment generation part 13. The secure text [$x_0$] is transmitted to the output part 15.

More specifically, the secure text generation part 12 generates secure texts [$x_0$], . . . , [$x_m$], as follows. First, Formula (1) is calculated for i=0, . . . , t, and generates the secure texts [$x_0$], . . . , [$x_t$].

$$[x_i] \leftarrow \text{Rand}(\ ) \qquad (1)$$

Next, Formula (2) is calculated for i=t+1, . . . , m, and generates the secure texts [$x_{t+1}$], . . . , [$x_m$].

$$[x_i] \leftarrow \sum_{j=0}^{t} \lambda'_j(k_i)[x_j] \qquad (2)$$

where $$\lambda'_j(x) = \prod_{0 \leq i \leq t, i \neq j} \frac{x - k_i}{k_j - k_i}$$

In step S122, the secure text generation part 12 generates secure texts [$y_i$] of "$y_i$" that satisfies $y_i = g(k_i)$ for i=0, . . . , m, as a random t-th order polynomial unknown to anyone. A method of generating secure texts [$y_0$], . . . , [$y_m$] may be performed in a manner analogous to that for secure texts [$x_0$], . . . , [$x_m$]. The secure texts [$y_1$], . . . , [$y_m$] are transmitted to the fragment generation part 13. The secure text [$y_0$] is transmitted to the output part 15.

In step S131, the fragment generation part 13 calculates Formula (3) for i=1, . . . , m, and generates values $\varepsilon_i$.

$$\varepsilon_i \leftarrow \text{Reveal}([x_i] - [a_i]) \qquad (3)$$

In step S132, the fragment generation part 13 calculates Formula (4) for i=1, . . . , m, and generates values $\rho_i$.

$$\rho_i \leftarrow \text{Reveal}([y_i] - [b_i]) \qquad (4)$$

In step S133, the fragment generation part 13 calculates Formula (5) for i=1, . . . , m, and generates secure texts [$z_i$]. The secure texts [$z_1$], . . . , [$z_m$] are transmitted to the random number synthesizing part 14.

$$[z_i] \leftarrow [c_i] + \varepsilon_i[b_i] + \rho_i[a_i] + \varepsilon_i\rho_i \qquad (5)$$

In step S14, the random number synthesizing part 14 calculates Formula (6), and generates a secure text [$z_0$]. The secure text [$z_0$] is transmitted to the output part 15.

$$[z_0] \leftarrow \sum_{j=1}^{2t+1} \lambda_j(k_0)[z_j] \qquad \Lambda\ (6)$$

where $$\lambda_j(x) = \prod_{1 \le i \le 2t+1, i \ne j} \frac{x - k_i}{k_j - k_i}$$

In step S15, the output part 15 outputs the combination of secure text ($[x_0]$, $[y_0]$ and $[z_0]$).

[Second Embodiment]

A secret random number synthesizing method according to a second embodiment is a method of generating a combination of secure texts of values "a", "b" and "c" having a relationship c=ab in a case of secrecy through additive secret sharing. In this embodiment, secure texts $[a_i]$, $[b_i]$ and $[c_i]$ to be input, and secure texts $[x_i]$, $[y_i]$ and $[z_i]$ to be generated are secure texts through additive secret sharing. The additive secret sharing is described in Non-patent literature 2, for example.

In step S121, when the secure text generation part 12 of the second embodiment generates the secure texts $[x_i]$ for i=0, . . . , t, each party generates a random value, and adopts the random value as a share of the secure texts $[x_i]$. In step S122, when the secure texts $[y_i]$ are generated for i=0, . . . , t, each party generates a random value, and adopts the random value as a share of the secure texts $[y_i]$.

According to the configuration as described above, the secret random number synthesizing technique of the present invention can create the secure texts ($[x]$, $[y]$ and $[z]$) of the combination of random values (x, y and z) that satisfy z=xy unknown to anyone even in a case where any t combinations among the secure texts ($[a_i]$, $[b_i]$ and $[c_i]$) of the m(=2t+1) combinations of random values ($a_i$, $b_i$ and $c_i$) that satisfy $c_i=a_ib_i$, have been leaked and are not expected to be known to anyone.

The point of the present invention is that multiplication of the secure texts of random values $x_0$ and $y_0$ are separated into (2t+1) multiplications. At this time, $[x]$ and $[y]$ are shared into (2t+1) secure texts using (t+1, 2t+1) threshold secret sharing. Accordingly, even if "t" combinations of pieces of information among (2t+1) combinations of secure texts have been leaked, none of "x" nor "y" can be revealed. As a result, the secure texts of combinations of random values unknown to anyone can be created.

The present invention is not limited to the embodiments described above. It is a matter of course that modification can be appropriately made in a scope without departing from the spirit of the present invention. The various types of processes described in the aforementioned embodiments can be executed in a time-series manner according to the order of description. Alternatively, such execution may be made in parallel or individually according to the processing capability of the device that executes the processes, as required.

[Program and Recording Medium]

In cases where the various processing functions in each device described in the above embodiments are implemented by a computer, the processing details of the functions to be included in each device are described as a program. The program is executed by the computer, thereby achieving the various processing functions in each device described above on the computer.

The program that describes the processing details can be recorded in a computer-readable recording medium. The computer-readable recording medium may be, for example, any recording medium, such as a magnetic recording device, an optical disk, a magneto-optical recording medium, or a semiconductor memory.

The program is distributed by, for example, selling, transferring, or lending a portable recording medium, such as DVD or CD-ROM, where the program is recorded. Alternatively, the program may be stored in a storing device of a server computer, and the program may be transferred from the server computer to another computer via a network, thereby distributing the program.

For example, the computer for executing such a program, first, stores the program recorded in the portable recording medium or transferred from the server computer, temporarily in its storing device. In execution of the process, the computer reads the program recorded in its recording medium, and executes the process according to the read program. According to another execution mode of this program, the computer may directly read the program from the portable recording medium, and execute the process according to the program. Further alternatively, every time the program is transferred to this computer from the server computer, the computer may successively execute the process according to the received program. Another configuration may be adopted that executes the process described above through a service of what is called an ASP (Application Service Provider) according to which the program is not transferred to this computer from the server computer, and the processing function is achieved only by an execution instruction therefor and acquisition of the result. The program according to this embodiment encompasses information that is provided for the process by the computer and conforms to the program (data and the like that are not direct instructions to the computer but have characteristics that define the process of the computer).

In this mode, this device is configured by executing a predetermined program on the computer. Alternatively, at least some of these processing details may be achieved as hardware.

What is claimed is:

1. A secret random number synthesizing device, wherein "t" is an integer of zero or more, m=2t+1, "i" is any of integers ranging from one to "m", inclusive, $[a_i]$, $[b_i]$ and $[c_i]$ are secure texts of "$a_i$", "$b_i$" and "$c_i$" whose numbers are each "m", $k_0, \ldots, k_m$ are (m+1) numbers whose values are different each other, and f(x) and g(x) are random t-th order polynomials, comprising:

circuitry configured to:

generate secure texts $[x_i]$ of $x_i$ satisfying $x_i=f(k_i)$, and secure texts $[y_i]$ of $y_i$ satisfying $y_i=g(k_i)$, for i=0, . . . , m;

generate $\varepsilon_i$ decrypted from $[x_i]-[a_i]$ and $\rho_i$ decrypted from $[y_i]-[b_i]$, for i=1, . . . , m, and calculate $[c_i]+\varepsilon_i[b_i]+\rho_i[a_i]\varepsilon_i\rho_i$ and generate secure texts $[z_1], \ldots, [z_m]$;

generate a secure text $[z_0]$ by calculating a following formula, $$[z_0] \leftarrow \sum_{j=1}^{2t+1} \lambda_j(k_0)[z_j]$$

where $$\lambda_j(x) = \prod_{1 \le i \le 2t+1, i \ne j} \frac{x - k_i}{k_j - k_i};$$

and output the combination of secure texts ($[x_0]$, $[y_0]$ and $[z_0]$).

2. The secret random number synthesizing device according to claim 1, wherein the circuitry configured to generate secure texts $[x_i]$ and $[y_i]$ of random values, for i=0, . . . , t, and generate secure texts $[x_i]$ and $[y_i]$ for i=t+1, . . . , m by calculating a following formula, $$[x_i] \leftarrow \sum_{j=0}^{t} \lambda'_j(k_i)[x_j],$$

$$[y_i] \leftarrow \sum_{j=0}^{t} \lambda'_j(k_i)[y_j]$$

where $$\lambda'_j(x) = \prod_{0 \le i \le t, i \ne j} \frac{x - k_i}{k_j - k_i}.$$

3. The secret random number synthesizing device according to claim 2,
wherein $[a_i]$, $[b_i]$, $[c_i]$, $[x_i]$, $[y_i]$ and $[z_i]$ are secure texts through additive secret sharing, and
for i=0, . . . , t, the circuitry configured to generate random values and adopts the random values as shares of the secure texts $[x_i]$, and generate random values and adopts the random values as shares of the secure texts $[y_i]$.

4. A secret random number synthesizing method, wherein "t" is an integer of zero or more, m=2t+1, "i" is any of integers ranging from one to "m", inclusive, $[a_i]$, $[b_i]$ and $[c_i]$ are secure texts of "$a_i$", "$b_i$" and "$c_i$" whose numbers are each "m", $k_0$, . . . , $k_m$ are (m+1) numbers whose values are different each other, and f(x) and g(x) are random t-th order polynomials, comprising:
generating secure texts $[x_i]$ of $x_i$ satisfying $x_i=f(k_i)$, and secure texts $[y_i]$ of $y_i$ satisfying $y_i=g(k_i)$, for i=0, . . . , m, by circuitry of a secret random number synthesizing device;
generating $\varepsilon_i$ decrypted from $[x_i]-[a_i]$ and $\rho_i$ decrypted from $[y_i]-[b_i]$, for i=1, . . . , m, and calculating $[c_i]+\varepsilon_i[b_i]+\rho_i[a_i]+\varepsilon_i\rho_i$ and generating secure texts $[z_1]$, . . . , $[z_m]$ by the circuitry of the secret random number synthesizing device;
generating a secure text $[z_0]$ by calculating a following formula by the circuitry of the secret random number synthesizing device, $$[z_0] \leftarrow \sum_{j=1}^{2t+1} \lambda_j(k_0)[z_j]$$

where $$\lambda_j(x) = \prod_{1 \le i \le 2t+1, i \ne j} \frac{x - k_i}{k_j - k_i};$$

and
outputting the combination of secure texts ($[x_0]$, $[y_0]$ and $[z_0]$).

5. A non-transitory computer readable medium including computer executable instructions that make a secret random number synthesizing device, wherein "t" is an integer of zero or more, m=2t+1, "i" is any of integers ranging from one to "m", inclusive, $[a_i]$, $[b_i]$ and $[c_i]$ are secure texts of "$a_i$", "$b_i$" and "$c_i$" whose numbers are each "m", $k_0$, . . . , $k_m$ are (m+1) numbers whose values are different each other, and f(x) and g(x) are random t-th order polynomials, perform a method comprising:
generating secure texts $[x_i]$ of $x_i$ satisfying $x_i=f(k_i)$, and secure texts $[y_i]$ of $y_i$ satisfying $y_i=g(k_i)$, for i=0, . . . , m;
generating $\varepsilon_i$ decrypted from $[x_i]-[a_i]$ and $\rho_i$ decrypted from $[y_i]-[b_i]$, for i=1, . . . , m, and calculating $[c_i]+\varepsilon_i[b_i]+\rho_i[a_i]+\varepsilon_i\rho_i$ and generating secure texts $[z_1]$, . . . , $[z_m]$;
generating a secure text $[z_0]$ by calculating a following formula, $$[z_0] \leftarrow \sum_{j=1}^{2t+1} \lambda_j(k_0)[z_j]$$

where $$\lambda_j(x) = \prod_{1 \le i \le 2t+1, i \ne j} \frac{x - k_i}{k_j - k_i};$$

and
outputting the combination of secure texts ($[x_0]$, $[y_0]$ and $[z_0]$).

* * * * *

UNITED STATES PATENT AND TRADEMARK OFFICE
CERTIFICATE OF CORRECTION

PATENT NO. : 10,657,847 B2
APPLICATION NO. : 15/762314
DATED : May 19, 2020
INVENTOR(S) : Koki Hamada et al.

It is certified that error appears in the above-identified patent and that said Letters Patent is hereby corrected as shown below:

In the Specification

Column 6, Lines 49-50, please change from "$[c_i] + \varepsilon_i[b_i] + \rho_i[a_i]\varepsilon_i\rho_I$" to --$[c_i] + \varepsilon_i[b_i] + \rho_i[a_i] + \varepsilon_i\rho_i$--.

Signed and Sealed this
Thirteenth Day of October, 2020

Andrei Iancu
*Director of the United States Patent and Trademark Office*